US012519856B1

(12) United States Patent
Stockert et al.

(10) Patent No.: US 12,519,856 B1
(45) Date of Patent: Jan. 6, 2026

(54) SYSTEM AND METHOD FOR MANAGING AN ENHANCED PERFORMANCE NETWORK USING ROLE-BASED AGENTS

(71) Applicants: AT&T Intellectual Property I, L.P., Atlanta, GA (US); AT&T Mobility II LLC, Atlanta, GA (US)

(72) Inventors: Mark Stockert, San Antonio, TX (US); Thomas J. Routt, Sequim, WA (US); Jerry Robinson, Middletown, NJ (US); Vijay Bhaskar Uppala, Bothell, WA (US); Imad Benbrahim, Marlboro, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 18/815,964

(22) Filed: Aug. 27, 2024

(51) Int. Cl.
*H04L 67/131* (2022.01)
*H04L 67/306* (2022.01)
*G06F 16/43* (2019.01)
*G06N 20/00* (2019.01)

(52) U.S. Cl.
CPC .......... *H04L 67/131* (2022.05); *H04L 67/306* (2013.01); *G06F 16/43* (2019.01); *G06N 20/00* (2019.01)

(58) Field of Classification Search
CPC ..... H04L 67/131; H04L 67/306; H04N 10/00; G06F 21/6245; G06F 16/43; G06N 20/00
See application file for complete search history.

(56) References Cited

U.S. PATENT DOCUMENTS

| | | | |
|---|---|---|---|
| 2018/0308000 A1* | 10/2018 | Dukatz | G06N 10/00 |
| 2020/0027050 A1* | 1/2020 | Ghosh | G06Q 10/06398 |
| 2021/0314340 A1* | 10/2021 | Ubriani | G06F 21/316 |
| 2022/0197930 A1* | 6/2022 | Shivamoggi | H04L 63/107 |
| 2023/0018068 A1* | 1/2023 | Rao | H04L 63/1425 |
| 2023/0206130 A1* | 6/2023 | Hsu | G06F 40/40 706/12 |
| 2024/0281697 A1* | 8/2024 | Patel | G06N 20/00 |
| 2024/0281779 A1* | 8/2024 | Richter | G06F 21/31 |
| 2024/0320922 A1* | 9/2024 | Appelbaum | G06T 19/00 |
| 2025/0077708 A1* | 3/2025 | Boynton | G06F 21/6245 |

* cited by examiner

*Primary Examiner* — Jungwon Chang
(74) *Attorney, Agent, or Firm* — Guntin & Gust, PLC; Dana B. LeMoine

(57) ABSTRACT

Aspects of the subject disclosure may include, for example, a device, including: a processing system including a processor; and a memory that stores executable instructions that, when executed by the processing system, facilitate performance of operations of: training a role-based agent to handle queries from users of a network; training a role-based foundation model to retrieve data relevant to a role of a user; receiving a query from the user; and providing the query to the role-based agent, wherein the role-based agent uses an associated role-based foundation model to process the query, collect relevant data from the network, and formulate an answer to the query. Other embodiments are disclosed.

20 Claims, 10 Drawing Sheets

| Role-Based Access | Foundation Model | Device Data | Reports (usage, etc) | Back-End Provisioning Systems | 5G/6G/Next G Core & RAN Network performance logs |
|---|---|---|---|---|---|
| Customers | Customer domain | X | X | | |
| Customer Care Agents | Care domain | X | X | X | |
| Network Engineers | Engineering domain | X | X | X | X |

FIG. 2B

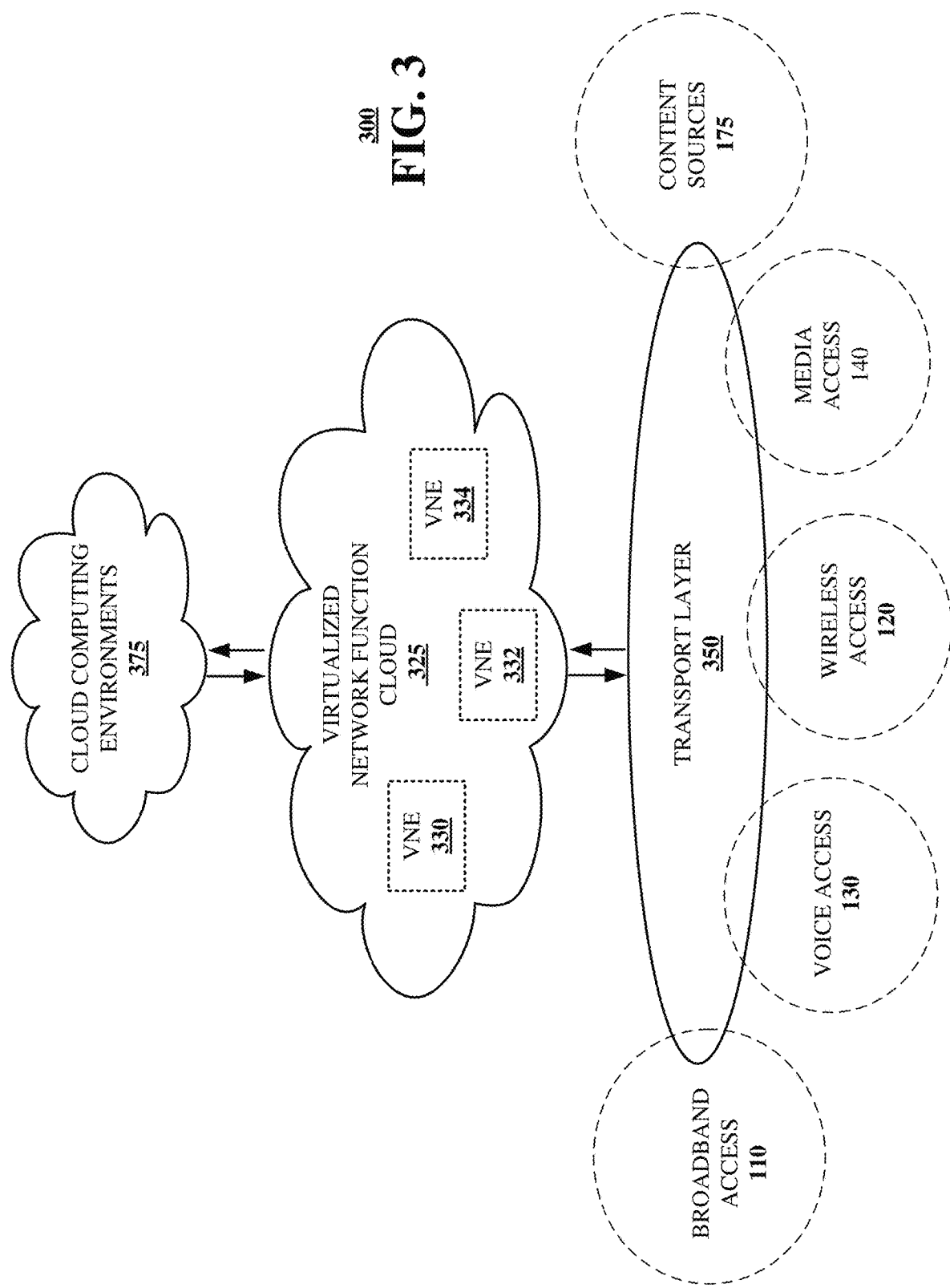

SYSTEM AND METHOD FOR MANAGING AN ENHANCED PERFORMANCE NETWORK USING ROLE-BASED AGENTS

FIELD OF THE DISCLOSURE

The subject disclosure relates to a system and method for managing an enhanced performance network using role-based agents.

BACKGROUND

Cellular networks are very sophisticated in terms of volume of data traffic handled, data rates or speed, and low latency. Cellular networks are quite complex systems that enable mobile communication across vast geographic areas. They consist of a large number of cell sites, each with its own antenna and equipment, spread over a wide area. These sites are interconnected and managed by a central control system, which ensures seamless communication as users move from one location to another.

Complexity arises from several factors, including frequency bands, network protocols and handover mechanisms. Cellular networks operate on specific frequency bands allocated by regulatory authorities. These bands are divided into channels, each assigned to a different cell to avoid interference. Rules and standards govern how data is transmitted and received over the network. Popular protocols include global system for mobile communications (GSM), code division multiple access (CDMA), and fourth generation (4G) long term evolution (LTE), each with its own advantages and limitations. When a mobile user moves from one cell to another, the network must transfer the connection seamlessly. This process, known as handover, ensures continuous service without dropped calls or interruptions. Despite their complexity, cellular networks are designed to be modular and expandable. The addition of new cells into the network is a fairly uncomplicated process, promoting modularity in expansion. This allows for the continuous growth and improvement of network coverage and capacity.

Beyond 4G networks, network engineers and technical support teams manually perform significant portions of fifth generation (5G) and next generation (NG) network management and troubleshooting. This approach requires extensive knowledge and experience and is time-consuming and prone to human error. 5G networks introduced a new level of complexity, with a massive increase in the number of connected devices, higher data rates, and the implementation of advanced technologies such as network slicing and edge computing. This complexity makes manual management and troubleshooting not only more challenging but also time-consuming. Engineers must sift through vast amounts of data to diagnose issues, configure network parameters, and ensure optimal performance. The manual nature of these tasks increases the risk of human error, which can lead to network downtime, degraded service quality, or security vulnerabilities.

The dynamic nature of 5G networks, characterized by their ability to adapt to changing traffic patterns and demands, requires constant vigilance and rapid response to maintain elevated levels of performance and reliability. Relying solely on manual processes can hinder the ability to respond swiftly to these changes, potentially impacting user experience and satisfaction. The time-consuming aspect of manual network management also has implications for operational efficiency and cost. Manual network management diverts skilled personnel from strategic tasks to routine maintenance, limiting the potential for innovation and improvement.

As 5G networks continue to grow in size and complexity, the scalability of manual processes becomes increasingly unsustainable. In essence, while the expertise and judgment of human engineers are invaluable, the limitations of manual network management in the context of 5G highlight the need for more automated, intelligent systems. These systems can assist human operators, reduce the likelihood of errors, and ensure that the potential of 5G technology is fully realized in a reliable, efficient, and secure manner.

Furthermore, the existing methods of network data analysis do not effectively leverage the potential of advanced AI techniques. AI has shown exceptional promise in various areas of technology, especially in data analysis and interpretation. However, applying AI in the context of next generation network management remains limited and unoptimized.

Finally, the feedback loop between the human operators and the system is often disjointed in current systems. Continuous improvement of the system based on human feedback is crucial for the system's adaptability and effectiveness. Lack of a proper mechanism for collecting and incorporating human feedback into the system limits potential improvements and adaptability of the system.

BRIEF DESCRIPTION OF THE DRAWINGS

Reference will now be made to the accompanying drawings, which are not necessarily drawn to scale, and wherein:

FIG. 2B is a chart illustrating an example, non-limiting embodiment of role-based access of agents in system 200 in accordance with various aspects described herein.

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for a system and method for managing an enhanced performance network using role-based agents. Other embodiments are described in the subject disclosure.

One or more aspects of the subject disclosure include a device, including: a processing system including a processor; and a memory that stores executable instructions that, when executed by the processing system, facilitate performance of operations of: training a role-based agent to handle queries from users of a network; training a role-based foundation model to retrieve data relevant to a role of a user; receiving a query from the user; and providing the query to the role-based agent, wherein the role-based agent uses an associated role-based foundation model to process the query, collect relevant data from the network, and formulate an answer to the query.

One or more aspects of the subject disclosure include a non-transitory machine-readable medium, comprising executable instructions that, when executed by a processing system including a processor, facilitate performance of operations of: implementing a role-based agent to handle queries from users of a network; implementing a role-based foundation model to retrieve data relevant to a role of a user; receiving a query from the user; and providing the query to the role-based agent, wherein the role-based agent uses an associated role-based foundation model to process the query, collect relevant data from the network based on the role, and formulate an answer to the query.

One or more aspects of the subject disclosure include a method of: training, by a processing system including a processor, a role-based agent to handle queries from a user of a network; receiving, by the processing system, a query from the user; providing, by the processing system, the query to the role-based agent; and invoking, by the processing system, a role-based foundation model associated with a role of the user, wherein the role-based agent uses the role-based foundation model to process the query, collect relevant data from the network based on the role, and formulate an answer to the query.

Figure 1:
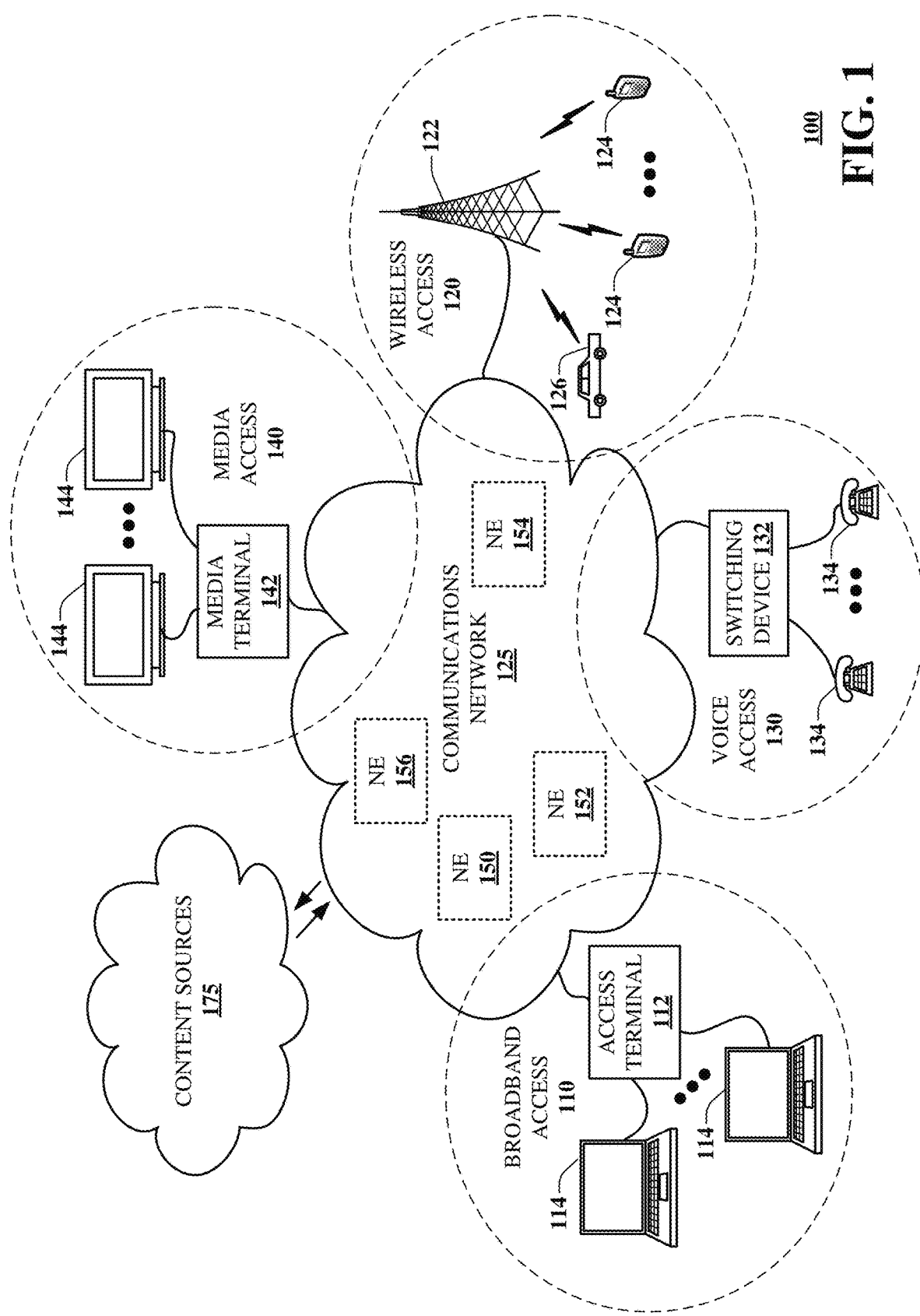
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part training role-based agents and role-based foundation models; retrieving data relevant to a role of a user; receiving queries; using an associated role-based foundation model to process queries, collect relevant data from a network, and formulate an answer to the queries. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or another switching device. Telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
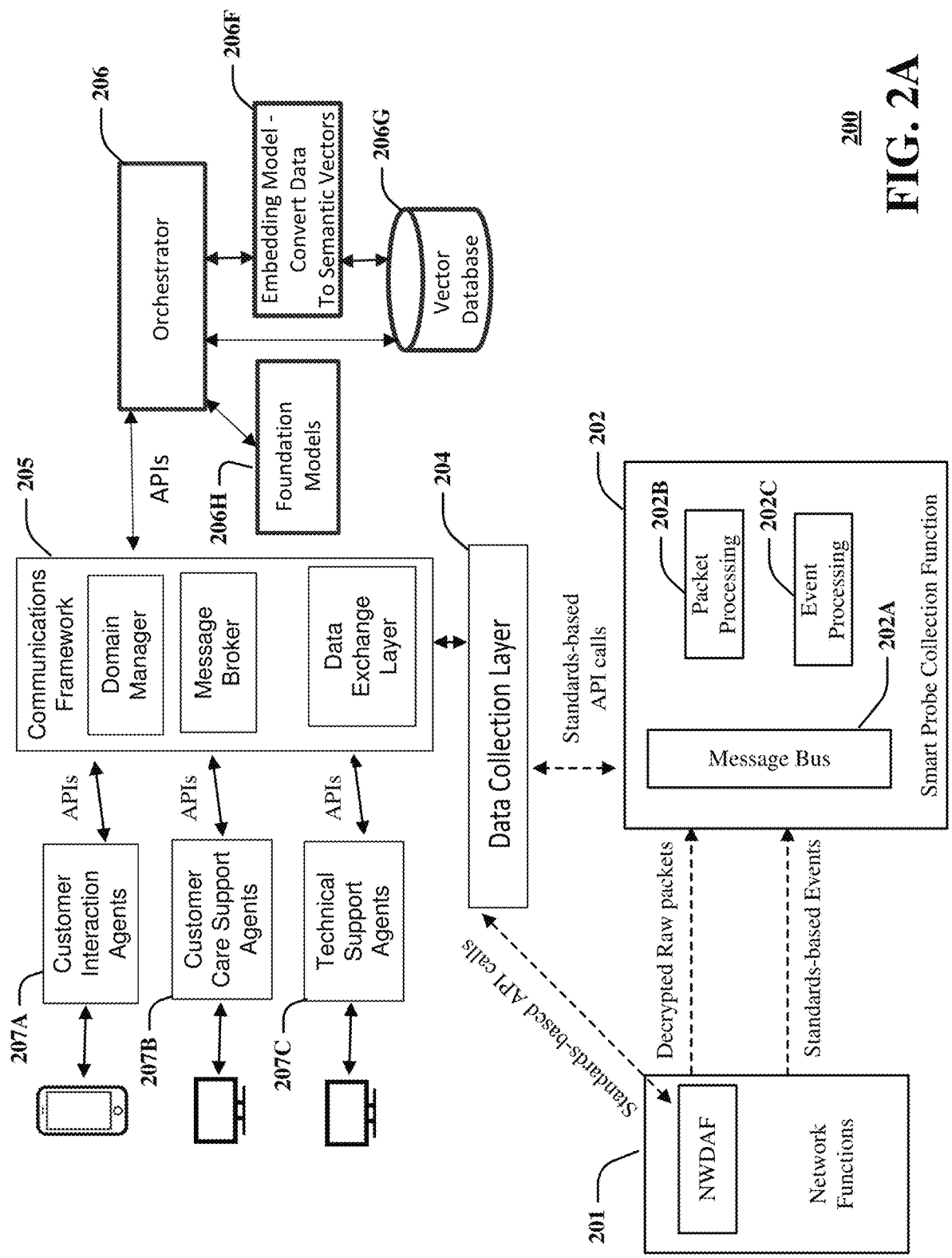
FIG. 2A is a block diagram illustrating an example, non-limiting embodiment of a system 200 comprising a network data analytics interface that can fully or partially function within the communication network of FIG. 1 in accordance with various aspects described herein.

FIG. 2A is a block diagram illustrating an example, non-limiting embodiment of a system 200 comprising a network data analytics interface that can fully or partially function within the communication network of FIG. 1 in accordance with various aspects described herein. More particularly, this figure shows a high-level view of system 200 that comprises a network of distributed, artificial intelligence (AI) software agents, each designated with a specific role or series of tasks that provide visibility into data generated by a high-performance networking service in a cellular network. The high-performance networking service may have higher bandwidth, higher speed, lower latency, or a higher quality class identifier (QCI), giving data generated or received by customers of the high-performance networking service priority over normal data traffic in the cellular network. The agents are distributed across systems, allowing for decentralized learning, decision-making and operations. The agents have learning capabilities to adapt to each user interaction. For example, if the user is a customer of the high-performance networking service, the agent can learn what product the customer is using, typical patterns of use for the customer, etc. The agents leverage foundation models, granting them the capability to understand natural language instructions, analyze textual and non-textual data, and generate responses that are fitting to the context of the service offered. This distributed nature enhances the system's scalability, resilience, and flexibility, enabling system 200 to efficiently handle complex, dynamic environments.

In an embodiment illustrated in FIG. 2A, system 200 incorporates a Smart Probe Collection Function 202 and a data collection layer (DCL 204) that interfaces with Network Functions (NF 201). For more information, see, e.g., U.S. patent application Ser. No. 18/756,385, filed Jun. 27, 2024, entitled System and Method for Self-Learning Management of Next Generation Networks, which is incorporated by reference herein. System 200 further comprises a communications framework 205, that interfaces with DCL 204 and an orchestrator 206. The protocols and Application Programming Interfaces (API) enable role-based agents 207A, 207B, 207C to interact with each other and with foundation models, as further discussed below.

Referring to FIG. 2A, it is seen that Smart Probe Collection Function 202 is in bi-directional communication with DCL 204 (i.e., the communication between Smart Probe Collection Function 202 and DCL 204 can be via various standards-based Application Programming Interface (API) calls. Further, it is seen that DCL 204 is in bi-directional communication with NF 201 (the communication between DCL 204 and NF 201 can be via various standards-based API calls. Further still, it is seen that NF 201 can provide to Smart Probe Collection Function 202 various data. For example, NF 201 can provide to Smart Probe Collection Function 202 the following: (a) decrypted raw packets, i.e., packet capture (pcap) and/or packet capture next generation (pcap-ng); (b) one or more Standards-based Events; and/or (c) any combination thereof. NF 201 can comprise an access control and mobility management function (AMF), a session management function (SMF), a data service management function, any 3GPP defined network function of next generation networks, or any combination thereof.

Further, a plurality of NFs can provide access to different network data. For example, a second NF, known as a Network Performance and Monitoring API (or NPMAPI), can provide user equipment (UE) specific Radio Access Network (RAN) performance metrics to external systems for use in device performance study and optimization. NPMAPI supports multiple Key Performance Indicators (KPIs), each of which can be attributed to particular UEs based on the International Mobile Subscriber Identifier (IMSI) of the UE and provide an averaged value over a 5-minute interval. KPIs include:
  RAN Bandwidth detection
  RAN Signal quality
  RAN cell congestion
  RAN Latency External systems may use NPMAPI data to study the UE's performance on the cellular network, understand and track usage patterns of different UEs for various planning purposes, take remedial actions for betterment of device connectivity e.g., improve Quality of Service (QOS) on Demand, make decisions about automated UE actions, e.g., notification pushes or firmware updates, etc.

Still referring to FIG. 2A, DCL 204 can request and/or command (such as via one or more standards-based API calls) NF 201 to provide certain data to Smart Probe Collection Function 202. In response to the request (or command) from DCL 204 to provide certain data, NF 201 provides such data to Smart Probe Collection Function 202. The data can be provided to Smart Probe Collection Function 202 at Message Bus 202A. Further, once the data is received by Smart Probe Collection Function 202, the data can undergo Packet Processing 202B and/or Event Processing 202C. In addition, Smart Probe Collection Function 202 can send processed data for storage. In one example, NF 201 must send the data requested/commanded by DCL 204. In one example, NF 201 will only send the data requested/commanded by DCL 204 if sending of such data is permitted by a policy (e.g., an internal policy) applicable to NF 201.

In an embodiment, the connection between DCL 204 and NF 201 enables DCL 204 to request and receive analytics data through a network interface from the Network Data Analytics Function (NWDAF), which is a component of the 5G core network defined by the 3GPP standards. NWDAF is designed to support the collection and analysis of data from various network functions (NFs) for the purpose of network optimization, anomaly detection, and the provisioning of analytics services to other NFs. NWDAF provides information about network congestion, device mobility patterns, service usage trends, and QoS metrics. DCL 204 can use this data to make informed decisions about how to manage the components it controls, such as dynamically adjusting the behavior of AI models based on current network conditions or optimizing data flow between components to ensure optimal performance in the following areas:

Dynamic Adaptation: With real-time insights from the NWDAF, the orchestrator can dynamically adjust the behavior of AI components, such as scaling resources, prioritizing tasks, or selecting the most efficient algorithms based on current network conditions. This ensures that AI-driven applications maintain high performance and responsiveness, even in changing network environments.

Optimized Resource Allocation: By understanding network conditions and user behavior, the orchestrator can optimize the allocation of computational and network resources among the components it manages. For example, it could prioritize bandwidth for critical data exchanges or allocate more processing power to components requiring intensive computation.

Predictive Analytics: Leveraging historical and real-time data from the NWDAF, the orchestrator could implement predictive analytics to forecast future network conditions or user behavior. This foresight allows for adjustments in the system, minimizing potential disruptions and enhancing user experience.

Enhanced Security and Privacy: With insights into network anomalies or potential security threats from the NWDAF, the orchestrator can enhance the security measures of the components it oversees, adjusting protocols and introducing safeguards in real-time to protect against emerging threats.

Service Customization and Personalization: Understanding user behavior and service usage patterns enables the orchestrator to customize and personalize AI-driven services at an individual level, improving user satisfaction and engagement.

Still referring to FIG. 2A, in one example, the standards-based API calls used between DCL 204 and Smart Probe Collection Function 202 can be the same as the standards-based API calls used between DCL 204 and NF 201. In another example, the standards-based API calls used between DCL 204 and Smart Probe Collection Function 202 can be different from the standards-based API calls used between DCL 204 and NF 201. In another example, the standards-based API calls used between DCL 204 and Smart Probe Collection Function 202 can be a superset of the standards-based API calls used between DCL 204 and NF 201. In another example, the standards-based API calls used between DCL 204 and Smart Probe Collection Function 202 can be a subset of the standards-based API calls used between DCL 204 and NF 201.

Communications framework 205 ensures seamless information exchange and coordinates actions. Communications framework 205 includes a domain manager, a message broker and a data exchange layer. The domain manager is responsible for managing access to different foundation models and data types using Role-Based Access Controls (RBAC) for the different agents based on agent domains. The domain manager ensures that only authorized entities can access specific foundation models and data, maintaining data security and privacy. By segmenting user interfaces into domains specific to each user group, the system ensures that all users receive relevant, understandable, and actionable information. Some exemplary role-based domains include, but are not limited to:

End Customer Agents: This domain includes individual customer agents who interact with the 5G/NG networks through various interfaces, such as mobile apps., web portals, etc. Access is restricted to their personal data, service usage and customer support interactions.

Customer Care Agents: These agents handle customer inquiries, troubleshooting and support. They have access to customer data, service status, and network performance metrics relevant to addressing customer issues.

Operations Engineering/Security Agents: Responsible for the maintenance and optimization of the 5G/NG networks, these agents need access to detailed network performance data, configurations and logs.

Service Manager Agents: These agents oversee the overall service quality and performance. They need access to aggregated data, performance reports and customer satisfaction metrics.

Third-Party Partner Agents: External vendors and/or service providers might need access to specific data for integrations and/or enhancements. Their access is tightly controlled to ensure security.

Network Analyst Agents: These agents access detailed historical data and perform trend analysis for network performance.

Marketing Agents: These agents access anonymized customer usage data to tailor marketing campaigns and promotions.

Compliance Agents: These agents access and report on data required for compliance with regulatory standards and reporting.

In an embodiment, the domain manager may assist system 200 to create 5G network slices. The domain manager can define different slices for various applications and customer segments, each with specific performance, security and QoS parameters. The domain manager may enforce RBAC for slices so that only authorized agents can access and manage specific slices. For example, end customer agents may only access customer-related slices, customer care agents may access customer and support-related slices, technical support agents may access slices for monitoring and troubleshooting, service managers may access performance and aggregated data across slices, and third-party partners' access will be controlled and limited to specific slices relevant to their services. Security personnel would have broad visibility across several slices.

The message broker manages the communication between different agents, data collectors, orchestrators and other components within the system. The message broker ensures that messages are correctly routed and delivered, facilitating seamless interaction between components. The message broker is "slice-aware" to manage communications effectively. The message broker can ensure messages related to specific slices are routed appropriately. For instance, data requests for a gaming slice are directed to the resources allocated for that slice. The message broker can manage QoS requirements for different slices, ensuring priority traffic is treated accordingly.

The data exchange layer interfaces with DCL 204 to gather data from network components (core, Radio Access Network (RAN), transport, etc.). In an embodiment, the data exchange layer interfaces directly with slice management functions of the 5G/NG network, referred to as the Network Slice Management Function (NSMF), which is defined in 3GPP standards. The NSMF interfaces with other 3GPP defined management functions within the 5G architecture to coordinate resources across the core and access networks. It works in tandem with the Network Slice Subnet Management Function (NSSMF) to ensure that each slice is properly supported by the underlying network infrastructure and services. The data exchange layer collects real-time data from each slice, including performance metrics, usage statistics, and event logs. The data exchange layer processes and stores data in a manner that respects the isolation and unique characteristics of each slice.

Orchestrator 206 handles tasks such as initiating data retrieval from APIs, managing the storage and retrieval of data within the vector database 206G, and ensuring that data is correctly formatted and presented to the embedding model 206F for processing. It is also responsible for coordinating with foundation models 206H for tasks that require advanced pattern recognition, generation of new data samples or complex decision-making processes. Additionally, orchestrator 206 can oversee learning processes that occur across multiple nodes or systems, aggregating knowledge without compromising the autonomy or privacy of subscribers. Orchestrator 206 is crucial for maintaining efficiency, scalability, and flexibility of system 200.

Orchestrator 206 uses embedding model 206F to convert data to semantic vectors that are stored in a vector database 206G, and foundation models 206H. Orchestrator 206 primarily facilitates data exchange among system 200 components through communications framework 205, thus enabling efficient execution of tasks that require the integration of several types of AI technologies. Orchestrator 206 also can request and/or command the communication network to dynamically create virtual resources to support network requirements.

In an embodiment, orchestrator 206 directs the communication network to dynamically provide virtual resources for ultra-low latency and high reliability communications requirements in high-performance service applications, including first responders, autonomous driving and remote healthcare procedures. Orchestrator 206 may create virtual resources in the communications network to provide ultra-low latency for immediate processing and analysis of data provided by Internet of Things (IoT) devices. Orchestrator 206 may create virtual resources in the communications network to provide seamless, immersive experiences for virtual and augmented reality applications including gaming, interactive learning and virtual tours.

Orchestrator 206 converts preprocessed/tokenized data to a format for training foundation models 206H. This requires converting the data to a numerical tensor which is then inputted to the model for training. Deep learning Generative Pre-training Transformer (GPT) models (familiar to those skilled in the art) partition the data to smaller chunks such as sequences of information that can be processed in parallel to vastly speed up the training process.

In an embodiment, orchestrator 206 has integrated slice management in its control mechanisms. Orchestrator 206 can allocate and adjust slice resources in real-time based on demand, ensuring optimal performance and resource use. Orchestrator 206 can also continuously monitor the performance of each slice and use AI models to analyze data, predict potential issues and recommend adjustments to the agents.

Foundation models 206H provide the linguistic and cognitive capabilities for agents 207A, 207B, 207C. Foundation models 206H are trained on vast datasets to understand and generate human-like text, images, video, audio and other signal types. Trained foundation models can be fine-tuned on a smaller, task-specific dataset to improve their performance. Fine-tuning involves adjusting the model parameters to minimize the loss function on the smaller dataset. Performance of the foundation models 206H can be evaluated on a validation set, which is a portion of training data set aside for evaluation purposes. Evaluation metrics such as accuracy, precision, recall, F1 scores or other metrics are used to compare performance of foundation models 206H and choose the best model for the specific task. In an embodiment, foundation models 206H may be role-based, like the role-based agents, and the domain manager and/or orchestrator 206 may be responsible for providing access to and invoking the appropriate role-based model. In an embodiment, human feedback is incorporated into the training process to align outputs of the foundation models 206H with user intent through the process of Supervised Fine-Tuning (SFT), which adapts a pre-trained foundation model to a specific domain by fine-tuning model parameters with a labeled dataset. In this embodiment the domain is 5G/NG Core and RAN data, events, messages, probe packets and other network data. Pre-trained weights of the model are used as initial values and then updated with backpropagation on the fine-tuning dataset. This allows the model to learn task-specific features while still retaining general knowledge acquired during pre-training.

Foundation models 206H can be used to summarize important performance data generated by the network. Some applications of summarization provided by foundation models 206H include:

Slice performance monitoring: Summarization can help condense the vast amount of data generated by each network slice into a manageable subset of key performance indicators (KPIs). This can enable network operators to quickly assess the performance of individual slices and ensure that they meet the desired service level agreements (SLAs).

Resource allocation and optimization: By summarizing resource usage and allocation data across all network slices, operators can identify trends, inefficiencies, and opportunities for optimization. This can lead to better resource allocation decisions, improving overall network performance and meeting the specific requirements of each slice.

Traffic analysis: Summarizing traffic patterns within and between network slices can help operators identify potential bottlenecks, congestion points, or security risks. This information can be used to optimize routing, load balancing, and slice configuration to ensure smooth and secure operation. In an embodiment, summarizing traffic patterns within and between network slices, Foundation Models 206H can identify security risks, such as anomalies, intrusion, segmentation, malware, and analysis of security incidents.

Summarization techniques can help detect anomalies in traffic patterns, such as sudden spikes in data transfer, repeated connection attempts, or unusual traffic volumes. These anomalies could signal potential security threats like Distributed Denial of Service (DDOS) attacks, intrusion attempts, or data exfiltration. Summarizing network traffic allows operators to assess the flow of data within and between slices, identifying potential risks associated with data leakage or unauthorized data access. This can help operators implement appropriate security measures, such as encryption or strict access controls, to safeguard sensitive data. Summarizing network traffic can enable operators to monitor connection patterns between slices and identify suspicious activities, such as unauthorized access attempts or unexpected cross-slice communication. Early detection of such activities can help operators respond promptly and prevent potential intrusions or data breaches. By analyzing summarized traffic patterns, network operators can identify the need for further network segmentation or isolation between slices, ensuring that sensitive data and critical services are protected from unauthorized access or potential threats originating from other slices. Summarized traffic data can reveal patterns indicative of malware or botnet activity, such as frequent communication with known command and control servers or many connections to specific external IP addresses. Identifying these patterns can help operators respond appropriately to mitigate the risks posed by malware or botnets. Summarized traffic data can be invaluable for incident response and forensic analysis in the event of a security breach. By providing a high-level overview of network activity, it can help operators pinpoint the source and scope of a security incident, enabling them to respond effectively and minimize potential damage.

Network planning and expansion: Summarizing historical data on network slice usage and performance can provide insights into trends and growth patterns. This information can be used to inform future network planning and expansion decisions, ensuring that network slices continue to meet the evolving needs of users and services.

In summary, applying summarization techniques enhances management and monitoring capabilities, leading to better resource allocation, improved performance monitoring, and more informed decision-making. By efficiently handling and analyzing substantial amounts of data generated by network and slices, operators can optimize their networks to better serve the diverse needs of various use cases and services.

System 200 further comprises the aforementioned role-based agents 207A, 207B and 207C that interface with communications framework 205. Role-based agents 207A, 207B and 207C develop and provide access to network data according to their role to aid in the management of the high-performance applications in communications network. These agent-based systems operate by distributing tasks among specialized agents, which collaborate to achieve complex goals. Each agent relies on the foundation models for natural language processing and generation, allowing it to interpret instructions, analyze data, and communicate effectively. In an embodiment, role-based agents comprise a customer interaction agent 207A, a customer care support agent 207B and a technical support agent 207C that provide information and assistance to a customer, customer care support personnel and network operations personnel, respectively. Access to data is restricted by the domain manager, as discussed above. In an example, customer interaction agent 207A that a customer interfaces with would not have access to more of the internal workings of the network, hence would have a defined role for helping customers. The customer interaction agent 207A can only access a subset of the data that customers should be able to see, and a customer care support agent 207B would have a role where they can see more than the customer agent, but not as much as a technical support agent 207C. People in operations have much wider access to the network and maybe less access to customer information. Each agent is equipped with specific functionalities, such as data collection, analysis, decision-making, or communication. Agents use foundation models 206H to understand instructions, queries, and contextual information.

During operation, tasks are assigned to agents based on their capabilities and roles. For example, a data collection agent might be tasked with gathering information from various sources, while an analysis agent interprets this data to generate insights. As mentioned above, agents use the foundation model core to understand instructions, queries, and contextual information. This allows them to process human language accurately and respond appropriately. Agents analyze data using built-in algorithms and the cognitive capabilities of the foundation model core. They make decisions based on this analysis, whether it is generating a report, recommending an action, or triggering a response. Agents communicate with each other using natural language, facilitated by the foundation model core. This enables seamless collaboration, as agents can share information, ask questions, and coordinate their actions to achieve the system's objectives.

In an example, system 200 can be used to replace all manual identification and troubleshooting of issues in a communication network. In an embodiment, system 200 has the ability to create filters and query data from probe repositories. System 200 reflects on itself and self-learns how much probing and tracing is required to troubleshoot and identify issues in the network. System 200 incorporates vector databases for efficient Generative AI vector storage and retrieval. System 200 incorporates AI to learn, adapt, and make sense of substantial amounts of data, and plays a crucial role in enhancing the efficiency and effectiveness of next generation network management. The benefits provided by system 200 include probing networks on-demand, thereby saving infrastructure and cost, monitoring relevant data as opposed to monitoring everything, proactively identifying issues in the network, providing relevant data for issues identified, providing relevant data for scenarios that require further investigation, and personalizing data gathering and tracing based on service type. Role-based agents coupled with foundation models are versatile and can be applied across various domains, from customer service to industrial automation. In customer service, for example, agents can handle inquiries, resolve issues, and provide personalized recommendations. In industrial settings, agents can monitor equipment, predict maintenance needs, and optimize production processes. The primary benefits of system 200 include:

Scalability: The system can handle a large number of tasks simultaneously by distributing them among multiple agents, each operating independently yet collaboratively.

Flexibility: Agents can be programmed to perform a wide range of tasks, adapting to different environments and requirements without extensive reconfiguration.

Efficiency: By leveraging the foundation model core, agents can process and analyze data quickly, making informed decisions and automating complex workflows.

Human-like Interaction: The use of foundation models enables agents to interact with users in a natural and intuitive manner, enhancing user experience and satisfaction.

In an embodiment, system 200 may employ one or more digital twins. A digital twin is a digital representation of a real-world object or system. Digital twins can represent a digital replica of the network, capturing the network's history as a real-time footprint. This digital representation enables advanced predictive maintenance and network performance monitoring. The digital twins can simulate the network under various conditions, enabling network operators to foresee potential issues and take preventive measures. For more information on digital twins, see, e.g., U.S. patent application Ser. No. 17/963,657, filed Oct. 11, 2022, entitled System and Method for Quantum Digital Twinning and Public Safety Management, which is incorporated by reference herein.

A digital twin offers a solution by creating a virtual replica of the network, enabling precise monitoring and management. The digital twin system, powered by generative AI, enables real-time monitoring and automated responses to network conditions. This capability allows for immediate action in response to emerging issues, optimizing network performance, and enhancing user satisfaction.

FIG. 2B is a chart illustrating an example, non-limiting embodiment of role-based access of agents in system 200 in accordance with various aspects described herein. As shown in FIG. 2B, each row of chart 210 indicates the role of each agent in the first column, an associated foundation model in the second column, and an indication of the type of data that each role-based agent has been provided access to. In the example shown, a customer agent is associated with a customer domain foundation model and has access to device data and usage reports. A customer care agent is associated with a care domain foundation model and additionally has access to data from back-end provisioning systems, as well as device data and usage reports. A network engineer agent is associated with an engineering domain foundation model and additionally has access to data from the core network performance and logs, as well as back-end provisioning systems, device data and usage reports.

Figure 2C:
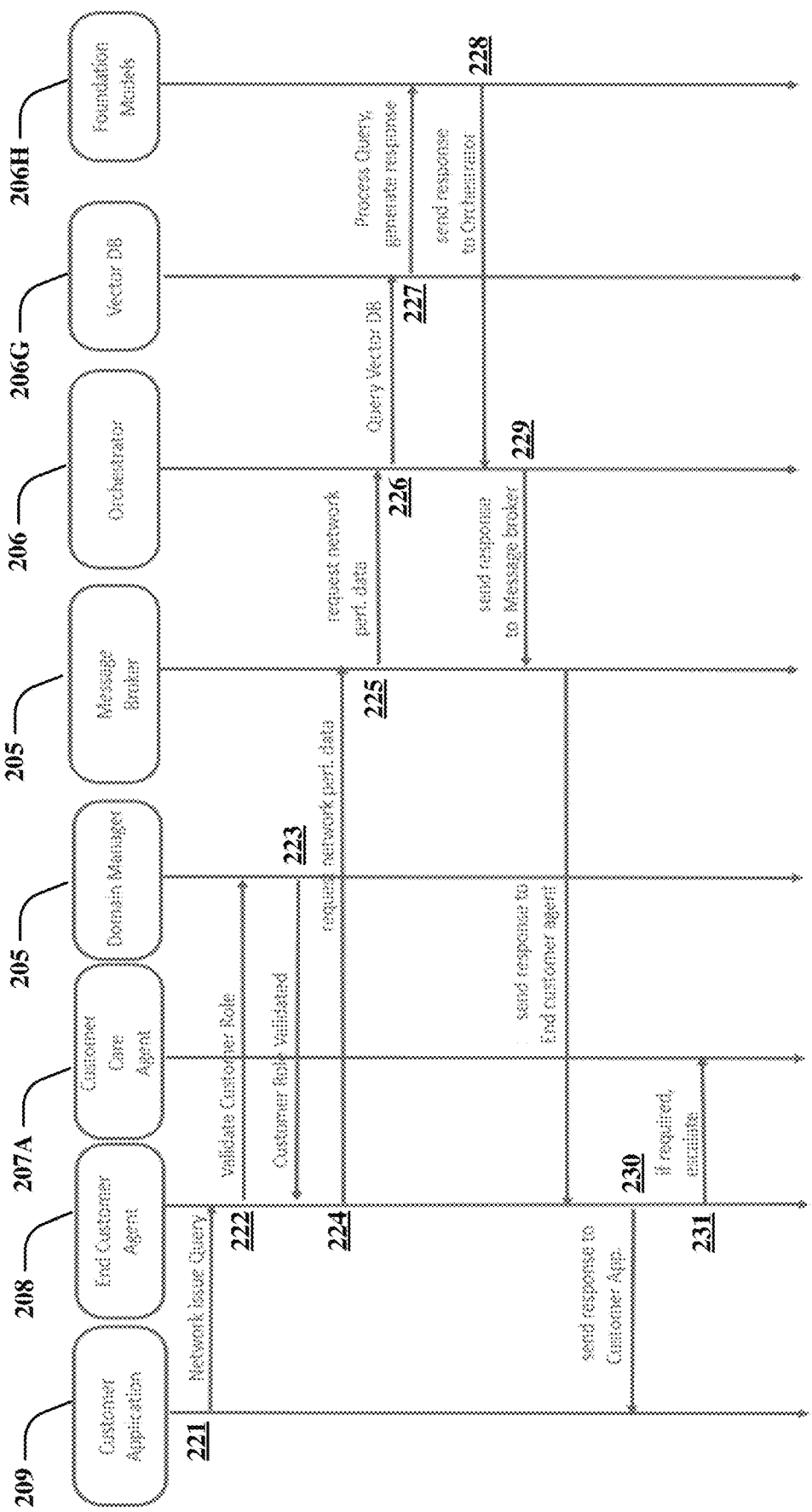
FIG. 2C is a message flow diagram illustrating an example, non-limiting embodiment of role-based access of agents in system 200 in accordance with various aspects described herein.

FIG. 2C is a message flow diagram illustrating an example, non-limiting embodiment of role-based access of agents in system 200 in accordance with various aspects described herein. As shown in FIG. 2C, method 220 begins at step 221 where a customer application 209 issues a query to an end customer agent 208 about network issues. Next in step 222, the end customer agent 208 requests validation of the customer's role and access permissions through the domain manager in the communications framework 205, with reference to FIG. 2A and as set forth above.

With further reference to FIG. 2A and the accompanying description above, the domain manager responds in step 223 with the requested validation and access permissions. Next in step 224, end customer agent 208 submits a request to the message broker in the communications framework 205 for network performance data related to the customer's location. In step 225, the message broker routes the request to the orchestrator 206. In step 226, the orchestrator 206 queries the vector database 206G for relevant network performance data and in step 227 processes the data using the associated foundation model 206H to identify potential issues, which in turn sends the processed data back to orchestrator 206 in step 228.

In step 229, orchestrator 206 sends the processed data and insights back to the end customer agent 208 through the message broker in the communications framework 205. In step 230, end customer agent 208 uses the provided data and insights to inform the customer application 209 about the issue and viable solutions. If needed in step 231, the end customer agent 208 escalates the issue to customer care agent 207A for further analysis and resolution.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
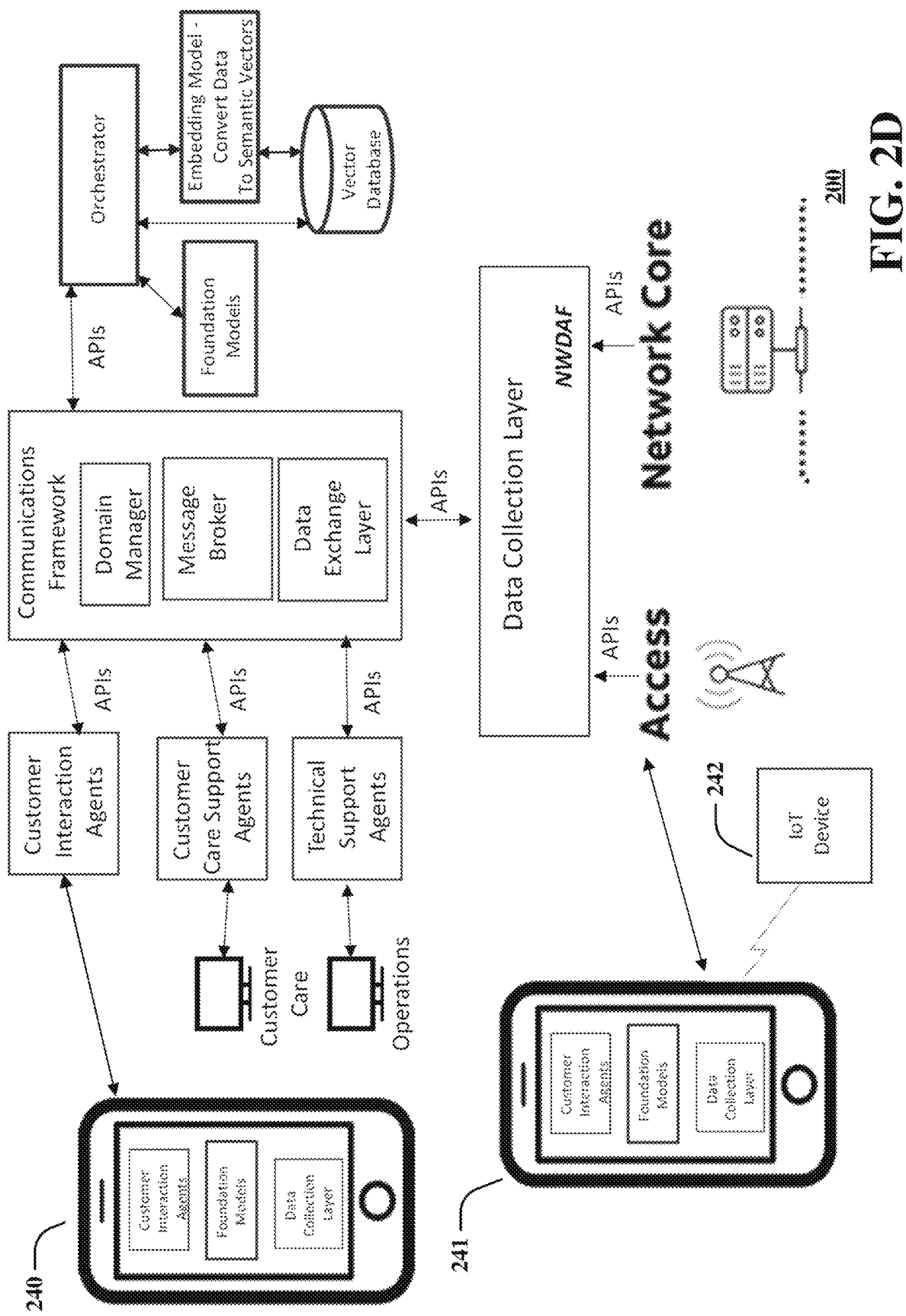
FIG. 2D is a block diagram illustrating an example, non-limiting alternate embodiments of system 200 comprising a network data analytics interface that can fully or partially function within the communication network of FIG. 1 in accordance with various aspects described herein.

FIG. 2D is a block diagram illustrating an example, non-limiting alternate embodiments of system 200 comprising a network data analytics interface that can fully or partially function within the communication network of FIG. 1 in accordance with various aspects described herein. In an embodiment, the role-based agents, foundation models and DCL may reside on mobile devices, such as mobile device 240. In another embodiment, the role-based agents, foundation models and DCL may reside on mobile devices, e.g., mobile device 241, that are networked with one or more Internet of Things (IoT) devices, e.g., IoT device 242, such that the IoT devices can share foundation models, network connectivity, data collection and agents.

In another embodiment, foundation models 206H can be applied to next generation network slicing to enhance management and monitoring capabilities. Network slicing is a key feature of 5G/NG networks that allows the creation of multiple virtual networks on top of a shared physical infrastructure. Each virtual network, or slice, can be tailored to specific use cases or services, such as IoT, autonomous vehicles, or emergency services in wide area disasters.

Figure 2E:
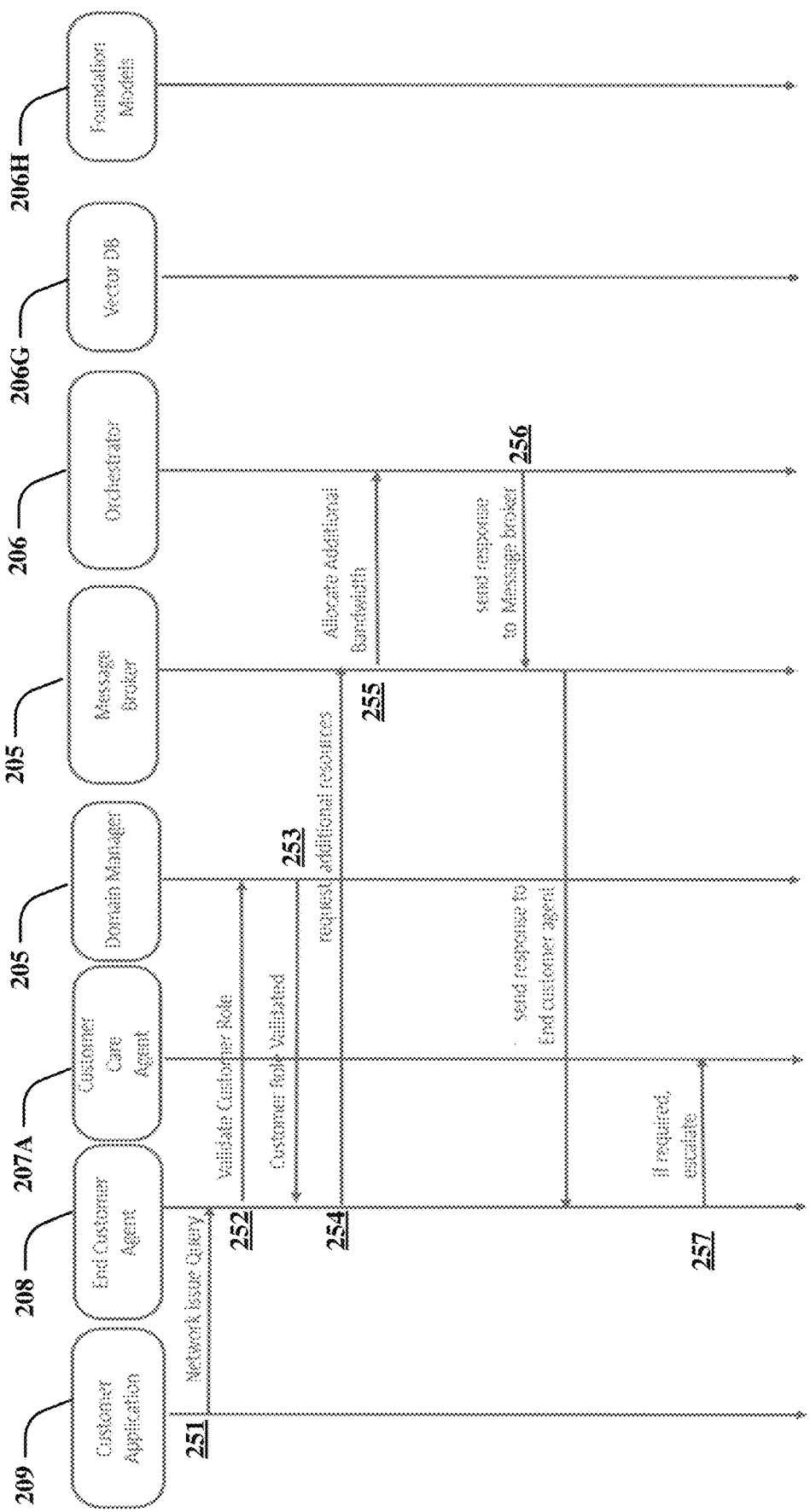
FIG. 2E is a message flow diagram illustrating an example, non-limiting embodiment of allocating additional bandwidth to a network slice in system 200 in accordance with various aspects described herein.

FIG. 2E is a message flow diagram illustrating an example, non-limiting embodiment of allocating additional bandwidth to a network slice in system 200 in accordance with various aspects described herein. As shown in FIG. 2E, method 250 begins at step 251 where a customer application 209 issues a query to an end customer agent 208 about network issues. Next in step 252, the end customer agent 208 requests validation of the customer's role and access permissions through the domain manager in the communications framework 205. The domain manager responds in step 253 with the requested validation and access permissions.

Next in step 254, end customer agent 208 determines that the customer's network slice is insufficient and submits a request to the message broker in the communications framework 205 for additional network resources. In step 255, the message broker routes the request to the orchestrator 206 as a request for additional bandwidth.

In step 256, orchestrator 206 sends a message back to the end customer agent 208 through the message broker in the communications framework 205 that the additional bandwidth has been allocated. In step 257, end customer agent 208 ensures that the additional bandwidth is proving effective for the network slice. If needed, the end customer agent 208 escalates the issue to customer care agent 207A for further analysis and resolution.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and methods 220 and 250 presented in FIGS. 1, 2A, 2B, 2C, 2D, 2E and 3. For example, virtualized communication network 300 can facilitate in whole or in part training role-based agents and role-based foundation models; retrieving data relevant to a role of a user; receiving queries; using an associated role-based foundation model to process queries, collect relevant data from a network, and formulate an answer to the queries.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud computer services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
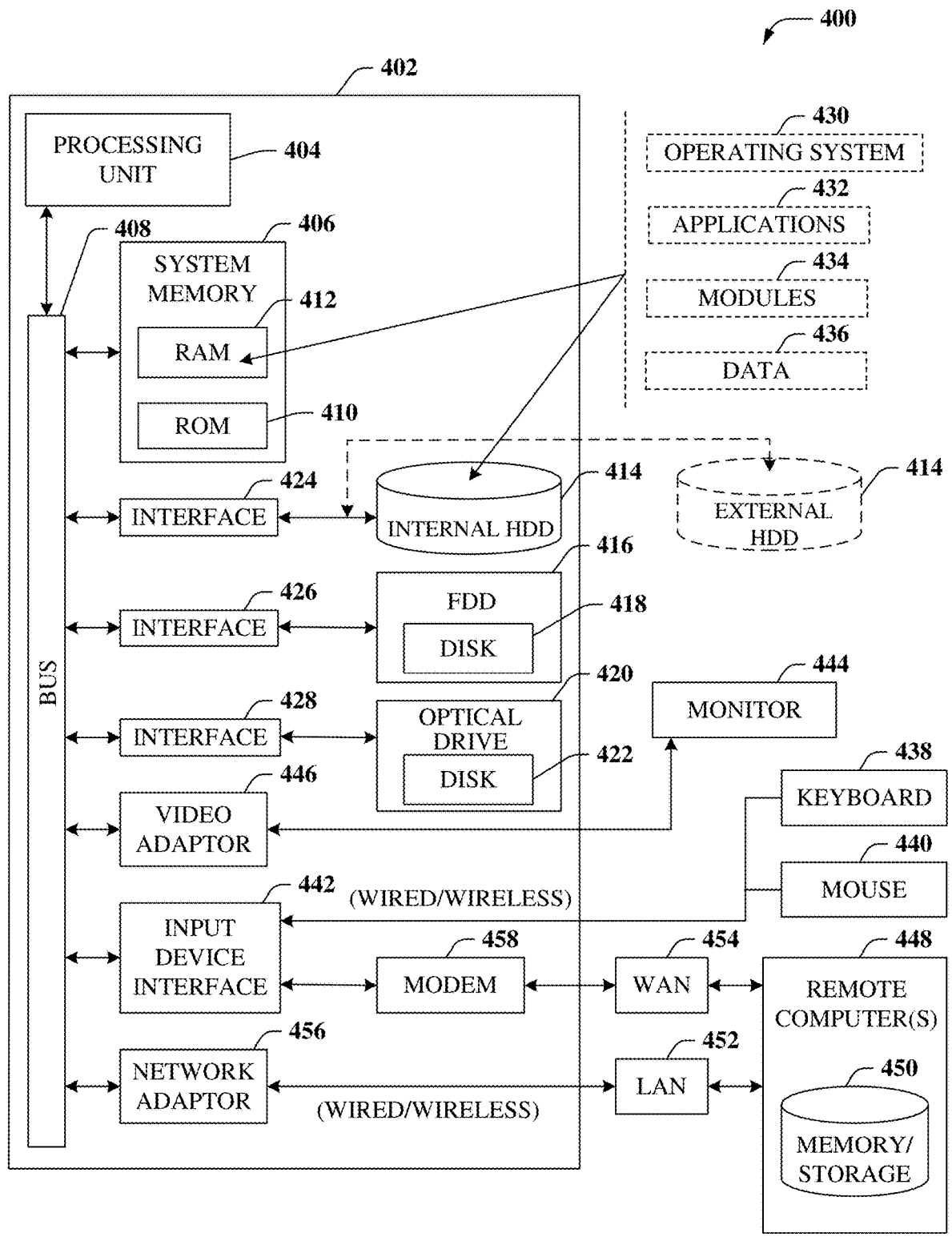
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a computing environment 400 suitable for implementing the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part training role-based agents and role-based foundation models; retrieving data relevant to a role of a user; receiving queries; using an associated role-based foundation model to process queries, collect relevant data from a network, and formulate an answer to the queries.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen and the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can also be connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. Modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
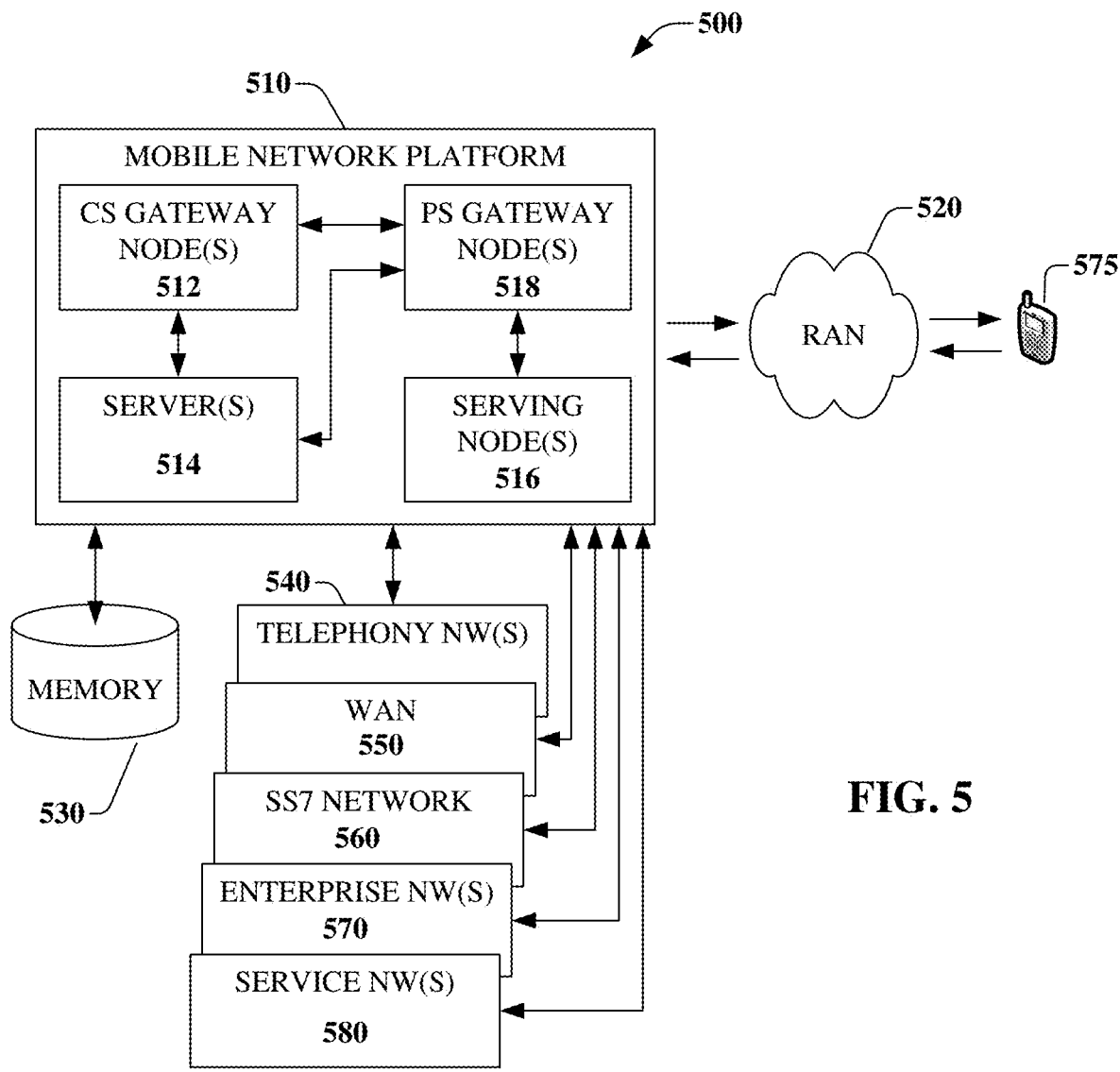
FIG. 5 is a block diagram of an example, non-limiting embodiment of a mobile network platform in accordance with various aspects described herein.

Turning now to FIG. 5, an embodiment of a mobile network platform 510 is shown that is an example of network elements 150, 152, 154, 156, and/or VNEs 330, 332, 334, etc. For example, platform 510 can facilitate in whole or in part training role-based agents and role-based foundation models; retrieving data relevant to a role of a user; receiving queries; using an associated role-based foundation model to process queries, collect relevant data from a network, and formulate an answer to the queries. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
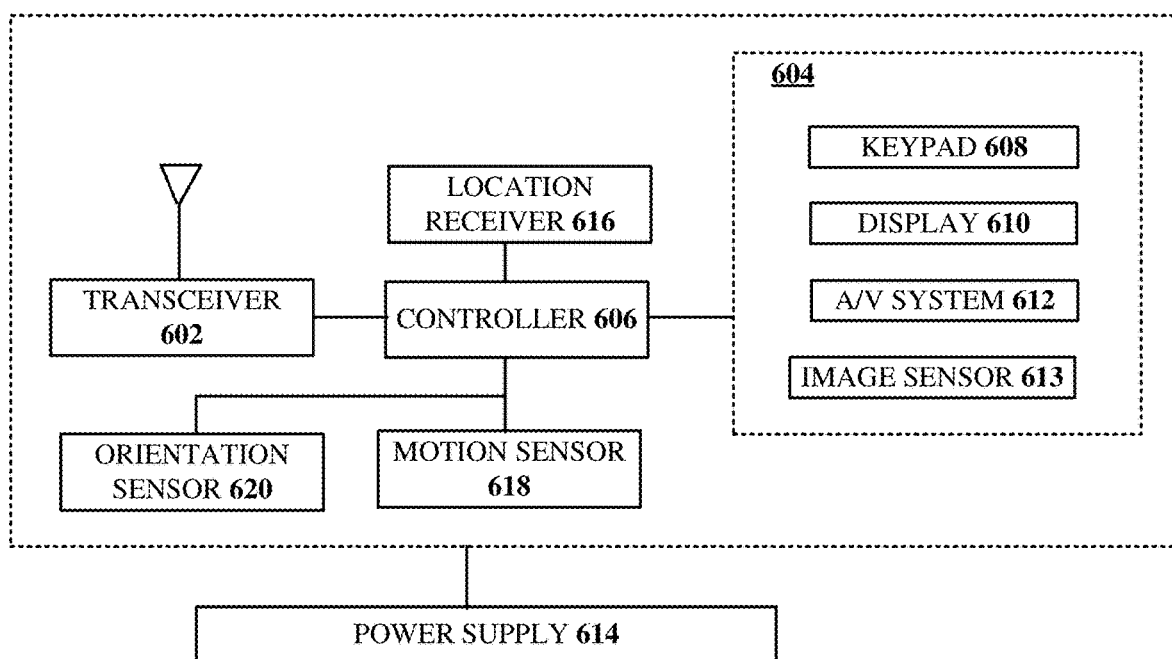
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part training role-based agents and role-based foundation models; retrieving data relevant to a role of a user; receiving queries; using an associated role-based foundation model to process queries, collect relevant data from a network, and formulate an answer to the queries.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. Display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals from an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for conducting various embodiments thereof. Moreover, the classifier can be employed to determine a ranking or priority of each cell site of the acquired network. A classifier is a function that maps an input attribute vector, $x=(x_1, x_2, x_3, x_4 \ldots x_N)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
training a role-based agent to handle queries from users of a network;
training a role-based foundation model to process network performance data relevant to a role of a user, wherein the training incorporates human feedback into the training to align outputs of the role-based foundation model with user intent through a process of Supervised Fine-Tuning (SFT);
receiving a query from the user; and
providing the query to the role-based agent, wherein the role-based agent uses an associated role-based foundation model to process the query, collect network performance data relevant to the query from the network, and formulate an answer to the query, wherein the processing system implements an orchestrator that dynamically provides virtual resources responsive to the query, and wherein the orchestrator trains the associated role-based foundation model initially using a first dataset, and wherein the orchestrator subsequently trains the role-based foundation model using a second dataset smaller than the first dataset during the process of SFT.

2. The device of claim 1, wherein the users comprise customers, customer support personnel, operations engineers, service managers, third-party partners, network analysts, marketers, compliance personnel and security personnel.

3. The device of claim 1, wherein the processing system implements a domain manager that receives the query, selects the associated role-based foundation model, and forwards the query to the associated role-based foundation model.

4. The device of claim 1, wherein the role-based agent is configured to escalate the query to a different agent having a higher level of access when the query cannot be resolved within the scope of the agent's assigned role.

5. The device of claim 1, wherein the virtual resources are created to support a high-performance service application.

6. The device of claim 5, wherein the high-performance service application is implemented in a 5G slice of the network.

7. The device of claim 5, wherein the high-performance service application provides low-latency and high-reliability communications for customers of the high-performance service application.

8. The device of claim 4, wherein the role-based foundation model is further configured to summarize network performance data to generate key performance indicators (KPIs) for monitoring network slices and identifying potential anomalies.

9. The device of claim 1, wherein the processing system comprises a plurality of processors operating in a distributed computing environment.

10. A non-transitory machine-readable medium, comprising executable instructions that, when executed by a processing system including a processor, facilitate performance of operations, the operations comprising:

implementing a role-based agent to handle queries from users of a network;

implementing a role-based foundation model to process network performance data relevant to a role of a user, wherein the implementing the role-based foundation model incorporates human feedback into a training process to align outputs of the role-based foundation model with user intent through a process of Supervised Fine-Tuning (SFT);

receiving a query from the user; and providing the query to the role-based agent, wherein the role-based agent uses an associated role-based foundation model to process the query, collect network performance data relevant to the query from the network based on the role, and formulate an answer to the query, wherein the processing system implements an orchestrator that dynamically provides virtual resources responsive to the query, and wherein the orchestrator trains the associated role-based foundation model initially using a first dataset, and wherein the orchestrator subsequently trains the role-based foundation model using a second dataset smaller than the first dataset during the process of SFT.

11. The non-transitory machine-readable medium of claim 10, wherein the users comprise customers, customer support personnel, operations engineers, service managers, third-party partners, network analysts, marketers, compliance personnel and security personnel.

12. The non-transitory machine-readable medium of claim 10, wherein the processing system implements a domain manager that receives the query, selects the associated role-based foundation model, and forwards the query to the associated role-based foundation model.

13. The non-transitory machine-readable medium of claim 10, wherein the processing system implements an orchestrator that dynamically provides virtual resources responsive to the query.

14. The non-transitory machine-readable medium of claim 13, wherein the orchestrator trains the associated role-based foundation model.

15. The non-transitory machine-readable medium of claim 13, wherein the virtual resources are created to support a high-performance service application.

16. The non-transitory machine-readable medium of claim 15, wherein the high-performance service application is implemented in a 5G slice of the network.

17. The non-transitory machine-readable medium of claim 15, wherein the high-performance service application provides low-latency and high-reliability communications for customers of the high-performance service application.

18. The non-transitory machine-readable medium of claim 10, wherein the processing system comprises a plurality of processors operating in a distributed computing environment.

19. A method of dynamically providing virtual resources by an orchestrator, comprising:

training, by a processing system including a processor, a role-based agent to handle queries from a user of a network;

receiving, by the processing system, a query from the user;

providing, by the processing system, the query to the role-based agent; and invoking, by the processing system, a role-based foundation model associated with a role of the user, wherein the role-based foundation model is trained to process network performance data relevant to a role of a user, wherein training of the role-based foundation model incorporates human feedback into the training to align outputs of the role-based foundation model with user intent through a process of Supervised Fine-Tuning (SFT);

wherein the role-based agent uses the role-based foundation model to process the query, collect network performance data relevant to the query from the network based on the role, and formulate an answer to the query, wherein the orchestrator dynamically provides the virtual resources responsive to the query, and wherein the orchestrator trains the associated role-based foundation model initially using a first dataset, and wherein the orchestrator subsequently trains the role-based foundation model using a second dataset smaller than the first dataset during the process of SFT.

20. The method of claim 19, comprising: providing, by the processing system, additional resources to a slice of the network responsive to the query.

* * * * *